United States Patent [19]
Bluhm et al.

[11] Patent Number: 5,644,741
[45] Date of Patent: Jul. 1, 1997

[54] PROCESSOR WITH SINGLE CLOCK DECODE ARCHITECTURE EMPLOYING SINGLE MICROROM

[75] Inventors: Mark W. Bluhm, Plano; Mark W. Hervin, Dallas; Steven C. McMahan; Raul A. Garibay, Jr., both of Richardson, all of Tex.

[73] Assignee: Cyrix Corporation, Richardson, Tex.

[21] Appl. No.: 138,855

[22] Filed: Oct. 18, 1993

[51] Int. Cl.$^6$ ............................................. G06F 9/22
[52] U.S. Cl. .................................................. 395/376
[58] Field of Search ...................... 364/DIG. 1 MS File, 364/DIG. 2 MS File; 395/375, 800

[56] References Cited

U.S. PATENT DOCUMENTS

| | | | |
|---|---|---|---|
| 3,634,883 | 1/1972 | Kreidermacher | 395/375 |
| 4,370,729 | 1/1983 | Bosch | 395/421.08 |
| 4,415,969 | 11/1983 | Bayliss et al. | 395/DIG. 1 |
| 4,429,361 | 1/1984 | Maccianti et al. | 395/775 |
| 4,430,706 | 2/1984 | Sand | 395/375 |
| 4,984,151 | 1/1991 | Dujari | 395/775 |
| 5,163,140 | 11/1992 | Stiles et al. | 395/467 |
| 5,210,883 | 5/1993 | Kaneko | 395/375 |
| 5,319,756 | 6/1994 | Ohno | 395/375 |

FOREIGN PATENT DOCUMENTS

| | | |
|---|---|---|
| A-0199134 | 10/1986 | European Pat. Off. |
| A-0223150 | 5/1987 | European Pat. Off. |
| A-0279953 | 8/1988 | European Pat. Off. |
| A-0338564 | 10/1989 | European Pat. Off. |
| A-372190 | 6/1990 | European Pat. Off. |
| A-0500151 | 8/1992 | European Pat. Off. |
| 2112973 | 7/1983 | United Kingdom. |
| 2230116 | 10/1990 | United Kingdom. |

OTHER PUBLICATIONS

Catthoor et al, "Architectural strategies for an application-specific synchronous multiprocessor environment", IEEE Acoustics, Speech, and Signal Processing Magazine, New York US, vol. 36, No. 2, Feb. 1988, pp. 265–283.

Schmitt–Landsiedel et al, "Pipeline architecture for fast CMOS buffer RAMs", IEEE Jornal of Solid–State Circuits, New York US, vol. 25, No. 3, Jun. 1990, pp. 741–746.

Chappell et al, "A 2–ns cycle, 3.8n–s access, 512–kb CMOS ECL SRAM with a fully pipelined architecture", IEEE Jornal of Solid–State Circuits, New York US, vol. 26, No. 11, Nov. 1991, pp. 1577–1585.

Jelemsky, et al "The MC68332 Microcontroller", IEEE Micro, vol. 9, No. 4, Aug. 1989.

Primary Examiner—Robert B. Harrell
Attorney, Agent, or Firm—Andrew S. Viger; John L. Maxin

[57] ABSTRACT

A processor includes storage circuitry for storing an instruction and memory circuitry addressable by a microaddress for outputting a microinstruction in response to the microaddress. The processor further includes sequencing circuitry coupled to provide the microaddress to the memory circuitry. Finally, the processor includes decode circuitry coupled to the storage circuitry for detecting whether the instruction stored in the storage circuitry comprises a single clock instruction before the memory circuit outputs the microinstruction, and for indicating to the sequencing circuitry in response to detecting whether the instruction stored in the storage circuitry comprises a single clock instruction.

13 Claims, 3 Drawing Sheets

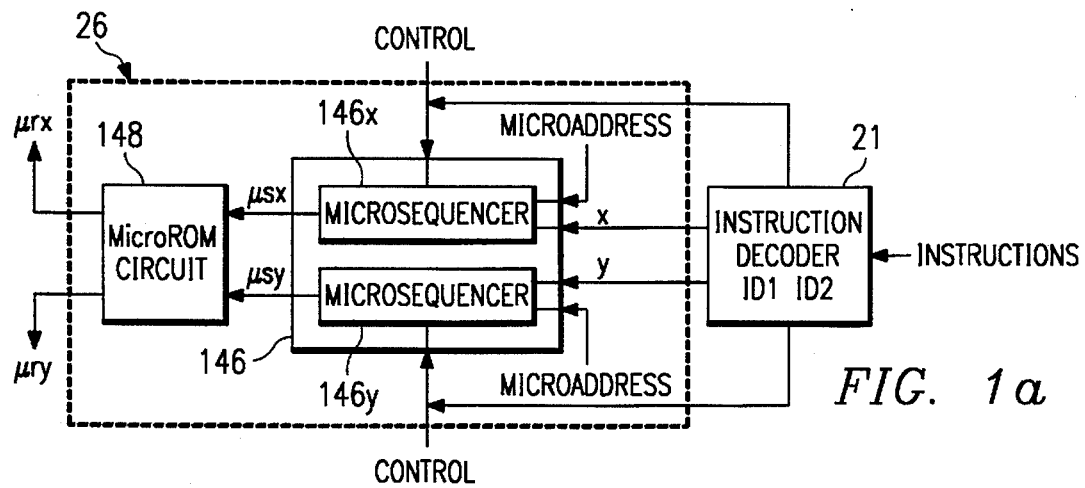
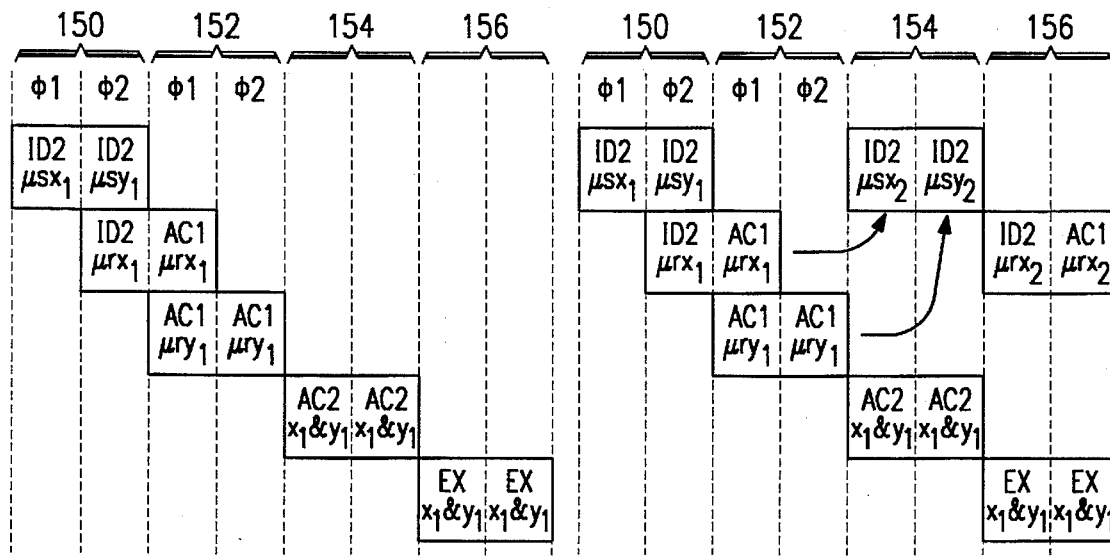
FIG. 1b
FIG. 1d (PRIOR ART)
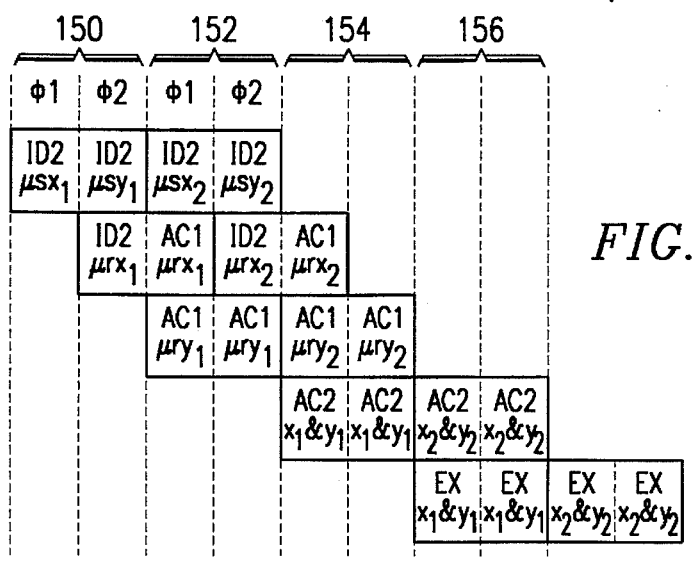
FIG. 1c

PROCESSOR WITH SINGLE CLOCK DECODE ARCHITECTURE EMPLOYING SINGLE MICROROM

TECHNICAL FIELD OF THE INVENTION

This invention relates in general to microprocessors and more particularly to a microprocessor having a single clock instruction decode architecture.

BACKGROUND OF THE INVENTION

In the design of a microprocessor, instruction throughput, i.e., the number of instructions executed per second, is of primary importance. The number of instructions executed per second may be increased by various means. The most straightforward technique for increasing instruction throughput is by increasing frequency at which the microprocessor operates. Increased operating frequency, however, is limited by fabrication techniques and also results in the generation of excess heat.

Thus, modern day microprocessor designs are focusing on increasing the instruction throughput by using design techniques which increase the average number of instructions executed per clock cycle period. One such technique for increasing instruction throughput is "pipelining." Pipelining techniques segment each instruction flowing through the microprocessor into several portions, each of which can be handled by a separate stage in the pipeline. Pipelining increases the speed of a microprocessor by overlapping multiple instructions in execution. For example, if each instruction could be executed in six stages, and each stage required one clock cycle to perform its function, six separate instructions could be simultaneously executed (each executing in a separate stage of the pipeline) such that one instruction was completed on each clock cycle. In this ideal scenario, the pipelined architecture would have an instruction throughput which was six times greater the non-pipelined architecture, which could complete one instruction every six clock cycles.

A second technique for increasing the speed of a microprocessor is by designing it to be a "superscalar." In a superscalar architecture, more than one instruction is issued per clock cycle. If no instructions were dependent upon other instructions in the flow, the increase in instruction throughput would be proportional to the degree of scaleability. Thus, if an architecture were superscalar to degree 2 (meaning that two instructions issued upon each clock cycle), then the instruction throughput in the machine would double.

A microprocessor may be both superpipelined (an instruction pipeline with many stages is referred to as "superpipelined") and superscalar to achieve a high instruction throughput. However, the operation of such a system in practice is far from the ideal situation where each instruction can be neatly executed in a given number of pipe stages and where the execution of instructions is not interdependent. In actual operation, instructions have varying resource requirements, thus creating interruptions in the flow of instructions through the pipeline. Further, the instructions typically have interdependencies; for example, an instruction which reads the value of a register is dependent on a previous instruction which writes the value to that same register—the second instruction cannot execute until the first instruction has completed its write to the register.

Consequently, while superpipelining and superscalar techniques can increase the throughput of a microprocessor, the instruction throughput is highly dependent upon the implementation of the superpipelined, superscalar architecture. One particular problem is reducing the number of wasted clock cycles following an instruction requiring only one clock cycle to perform its execution stage. Such an instruction executes its corresponding microinstruction in a single clock cycle, and is hereinafter referred to as a "single clock instruction." Particularly, under current pipeline architectures, after a single clock instruction, additional clock cycles are expended before the next instruction's microaddress is obtained. Consequently, the next successive instruction corresponding to that microaddress is detained from advancing through the pipeline.

Therefore, a need has arisen for a microprocessor architecture wherein the number of clock cycles before obtaining the next microaddress following a single clock instruction is reduced over those in the prior art.

SUMMARY OF THE INVENTION

The present invention is an improved processor architecture and methodology. The processor includes storage circuitry for storing an instruction and memory circuitry addressable by a microaddress for outputting a microinstruction in response to the microaddress. The processor further includes sequencing circuitry coupled to provide the microaddress to the memory circuitry. Finally, the processor includes decode circuitry coupled to the storage circuitry for detecting whether the instruction stored in the storage circuitry comprises a single clock instruction before the memory circuit outputs the microinstruction, and for indicating to the sequencing circuitry in response to detecting whether the instruction stored in the storage circuitry comprises a single clock instruction.

The processor and methodology of the present invention give rise to numerous technical advantages. For example, one technical advantage is reduced delay following a single clock instruction. From this, there is the additional technical advantage of enhanced processor throughput. As yet another advantage, the invention has application with either single or multiple-pipeline processors. Still other technical advantages should be readily ascertainable to a person having skill in the art with reference to the following description, claims, and drawings.

BRIEF DESCRIPTION OF THE DRAWINGS

For a more complete understanding of the present invention, and the advantages thereof, reference is now made to the following descriptions taken in conjunction with the accompanying drawings, in which:

FIG. 1a illustrates a simplified block diagram including the microsequencer and microROM of the microprocessor;

FIG. 1b illustrates a timing diagram showing the generation of a microaddress and the resultant microinstruction output by the microROM;

FIG. 1c illustrates a timing diagram showing the wasted clock cycle in the prior art between generation of a microinstruction and obtaining the next successive microaddress;

FIG. 1d illustrates a timing diagram showing the preferred timing of one aspect of the present invention in generating a microinstruction and obtaining the next successive microaddress;

DETAILED DESCRIPTION OF THE PREFERRED EMBODIMENTS

Figure 2:
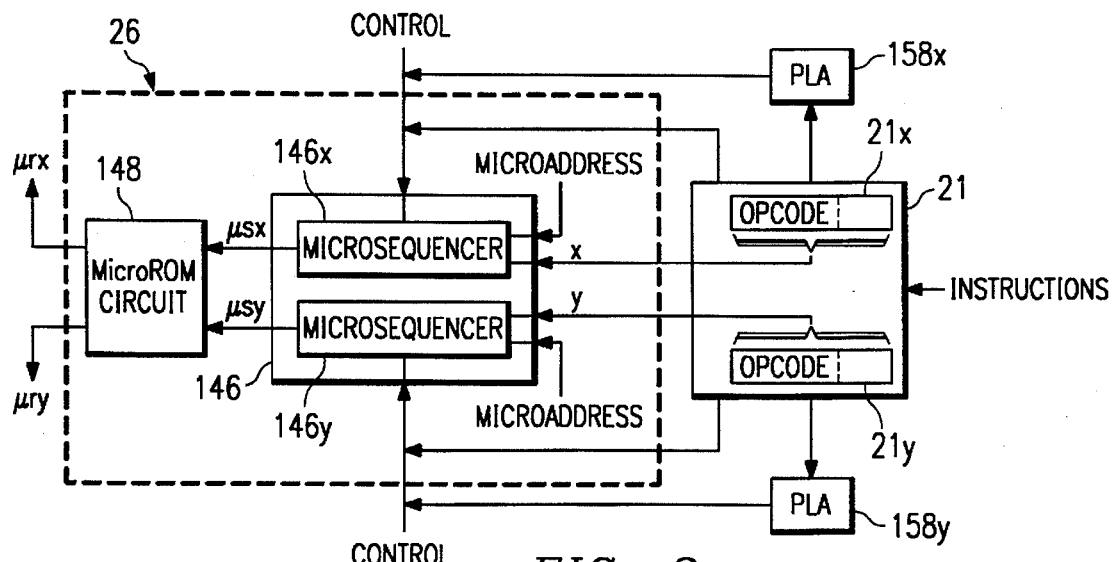
FIG. 2 illustrates a block diagram of FIG. 1a including a detailed illustration of each instruction register and its respective PLA.

The detailed description of an exemplary embodiment of the microprocessor of the present invention is organized as follows:

1. Exemplary Processor System
   1.1. Microprocessor.
   1.2. System
2. Generalized pipeline architecture
3. Single clock instruction decode architecture
4. Single microROM operation for supporting dual pipeline architecture
5. Expediting Execution of Condition Dependent Instructions
6. Conclusion This organizational table, and the corresponding headings used in this detailed description, are provided for the convenience of reference only. Detailed description of conventional or known aspects of the microprocessor are omitted as to not obscure the description of the invention with unnecessary detail.

1. Exemplary Processor System 1.1. Microprocessor

The major sub-blocks of an exemplary superscalar, superpipelined include: (a) a CPU core, (b) a prefetch buffer, (c) a prefetcher, (d) a branch processing unit (BPU), (e) a translation lookaside buffer (TLB), and (f) a unified 16 Kbyte code/data cache, including a TAG RAM. A 256 byte instruction line cache provides a primary instruction cache to reduce instruction fetches to the unified cache, which operates as a secondary instruction cache. An onboard floating point unit (FPU) executes floating point instructions issued to it by the CPU core.

The microprocessor uses internal 32-bit address and 64-bit data buses ADS and DATA. A 256 bit (32 byte) prefetch bus PFB, corresponding to the 32 byte line size of the unified cache and the instruction line cache, allows a full line of 32 instruction bytes to be transferred to the instruction line cache in a single clock. Interface to external 32 bit address and 64 bit data buses is through a bus interface unit (BIU).

The unified cache is 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache), using an LRU replacement algorithm.

The FPU includes a load/store stage with 4-deep load and store queues, a conversion stage (32-bit to 80-bit extended format), and an execution stage. Loads are controlled by the CPU core, and cacheable stores are directed through the write buffers (i.e., a write buffer is allocated for each floating point store operation).

The CPU core is a superscalar design with two execution pipes X and Y. It incudes an instruction decoder 21, two address calculation units, execution units, and a register file with 32 32-bit registers. An AC control unit includes a register translation unit with a register scoreboard and register renaming hardware. A microcontrol unit, including a microsequencer and microrom, provides execution control.

Writes from the CPU core are queued into twelve 32 bit write buffers—write buffer allocation is performed by the AC control unit. These write buffers provide an interface for writes to the unified cache—noncacheable writes go directly from the write buffers to external memory. The write buffer logic supports optional read sourcing and write gathering.

A pipe control unit controls instruction flow through the execution pipes, including keeping the instructions in order until it is determined that an instruction will not cause an exception, squashing bubbles in the instruction stream, and flushing the execution pipes behind branches that are mispredicted and instructions that cause an exceptions. For each stage, the pipe control unit keeps track of which execution pipe contains the earliest instruction, and provides a stall output and receives a delay input.

The X and Y execution pipelines each include seven stages: instruction fetch IF, two instruction decode stages ID1 and ID2, two address calculation stages AC1 and AC2, execution EX, and write-back WB. Note that the complex instruction decode ID and address calculation AC pipe stages are superpipelined.

The IF stage provides a continuous code stream into the CPU core. The prefetcher fetches 16 bytes of instruction data into the prefetch buffer from either the (primary) instruction line cache or the (secondary) unified cache. The BPU is accessed with the prefetch address, and supplies target addresses to the prefetcher for predicted changes of flow, allowing the prefetcher to shift to a new code stream in one clock.

The decode stages ID1 and ID2 decode the variable length X86 instruction set. The instruction decoder retrieves 16 bytes of instruction data from the prefetch buffer each clock. In ID1, the length of two instructions is decoded (one each for the X and Y execution pipes) to obtain the X and Y instruction pointers—a corresponding X and Y bytes-used signal is sent back to the prefetch buffer (which then increments for the next 16 byte transfer). Also in ID1, certain instruction types are determined, such as changes of flow, and immediate and/or displacement operands are separated. The ID2 stage generates completes decoding the X and Y instructions, generating entry points for the microrom and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit (register scoreboard and register renaming hardware)—the 32 physical registers are used to map the 8 general purpose programmer visible logical registers defined in the X86 architecture (EAX, EBX, ECX, EDX, EDI, ESI, EBP, ESP). During the AC2 stage, the register file and the unified cache are accessed with the physical address (for cache hits, cache access time for the dual ported unified cache is the same as that of a register, effectively extending the register set)—the physical address is either the linear address, or if address translation is enabled, a translated address generated by the TLB.

Translated addresses are generated by the TLB from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the TLB (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EXX stage contains multiply/divide hardware.

The write back stage WB updates the register file, condition codes, and other parts of the machine state with the results of the previously executed instruction.

The microprocessor supports speculative execution in the case of both branch and floating point instructions. That is, instructions following either a floating point instruction, or a branch for which the BPU has predicted the direction (taken or not taken), are speculatively allowed to proceed in the execution pipelines and complete execution. If a floating point instruction faults (which may be tens or even hundreds of clocks after being issued to the FPU) or if a branch is mispredicted (which will not be known until the EX or WB stage for the branch), then the execution pipeline must be repaired to the point of the faulting or mispredicted instruction (i.e., the execution pipeline is flushed behind that instruction), and instruction fetch restarted.

Pipeline repair is accomplished by creating checkpoints of the machine state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

1.2. System

For the exemplary embodiment, the microprocessor is used in a processor system that includes a single chip memory and a bus controller. The memory/bus controller provides the interface between the microprocessor and the external memory subsystem—level two cache and main memory—controlling data movement over the 64 bit processor data bus PD (the data path is external to the controller which reduces its pin count and cost).

The memory/bus controller interfaces directly to the 32-bit address bus PADDR, and includes a one bit wide data port for reading and writing registers within the controller. A bidirectional isolation buffer provides an address interface between the microprocessor and VL and ISA buses.

The memory/bus controller provides control for the VL and ISA bus interface. A VL/ISA interface chip (such as an HT321) provides standard interfaces to a 32 bit VL bus and a 16 bit ISA bus. The ISA bus interfaces to a BIOS, a keyboard controller, and an I/O chip, as well as standard ISA slots. The VL/ISA interface chip interfaces to the 32 bit VL bus through a bidirectional 32/16 multiplexer formed by dual high/low word [31:16]/[15:0] isolation buffers. The VL bus interfaces to standard VL slots, and through a bidirectional isolation buffer to the low double word [31:0] of the 64 bit processor data bus.

2. Generalized Pipeline Architecture

The following details the flow, or overlapping execution, of four instructions through a two pipeline architecture. Additional pipelines and additional stages for each pipeline could also be provided. In the preferred embodiment, the microprocessor uses an internal clock which is a multiple of a system clock. The internal clock operates at two times the frequency of the system clock. During the first internal clock cycle, the ID1 stage operates on respective instructions X0 and Y0. During the next internal clock cycle, instructions X0 and Y0 are in the ID2 stage (X0 being in ID2x and Y0 being in ID2y) and instructions X1 and Y1 are in the ID1 stage. During the next internal clock cycle, instructions X2 and Y2 are in the ID1 stage, instructions X1 and Y1 are in the ID2 stage (X1 being in ID2x and Y1 being in ID2y) and instructions X0 and Y0 are in the AC1 stage (X0 being in AC1x and Y0 being in AC1y). During the next internal clock cycle, instructions X3 and Y3 are in the ID1 stage, instructions X2 and Y2 are in the ID2 stage, instructions X1 and Y1 are in the AC1 stage and instructions X0 and Y0 are in the AC2 stage. The instructions continue to flow sequentially through the stages of the X and Y pipelines. In the next four sequential clock cycles, the execution portion of each instruction is performed. This is a major advantage of a pipelined architecture—the number of instructions completed per clock is increased, without reducing the execution time of an individual instruction. Consequently a greater instruction throughput is achieved with greater demands on the speed of the hardware.

The instruction flow described herein is an optimum case—each pipe stage completes on time and no stage requires more than one clock cycle. In an actual machine, however, one or more stages may require additional clock cycles to complete thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require the either, or both, sides of the AC1 stage to delay until the data was retrieved from main memory. For a particular stage, other stages of the pipeline may be using a needed resource, such as a multiplier, which is only in one of the execution stages in the illustrated embodiment. In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle to complete. These instructions stop the flow of subsequent instructions through the pipeline at the output of the ID2 stage.

The flow of instructions through the pipeline is controlled by the pipe control unit. In the preferred embodiment, a single pipe control unit is used to control the flow of instructions through both (or all) of the pipes. To control the flow of instructions through the pipes, the pipe control unit receives "delay" signals from the various units comprising the pipelines and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Single Clock Instruction Decode Architecture

FIG. 1a depicts a block diagram having certain components involved in the generation of microaddresses and the resulting microinstructions. While the blocks of FIG. 1a derive from those described above, it should be understood that the method of the present invention is not necessarily limited by the particular locations of specific components, and one skilled in the art may relocate various functionality without departing from the inventive scope. With reference to FIG. 1a, instructions for both the x- and y-pipelines are coupled to an instruction decoder 21. Decoder 21 receives the x- and y-instructions and provides both microaddresses and control to the microcontrol unit. More particularly, the microaddresses and control are coupled to a microsequencer circuit 146 within the microcontrol unit. In the preferred embodiment, microsequencer circuit 146 includes independent microsequencers 146x and 146y for performing like functions with respect to the x- and y-pipelines. Microsequencer circuit 146 also receives both control and microaddresses from other sources (not shown) throughout the microprocessor. Microsequencer circuit 146 is coupled to provide addresses, hereinafter referred to as microaddresses, to address the memory (shown and described later) in a microROM circuit 148.

FIG. 1b illustrates the timing of microaddress generation, microinstruction generation, and microinstruction execution by the blocks of FIG. 1a. Note that the timing of FIG. 1b corresponds to the operations of the blocks of FIG. 1a. Note also that the stages of FIG. 1b illustrate the sequence of an x- and y-instruction through four internal clock cycles evenly numbered 150 through 156. Clock cycles 150 through 156 include the ID2, AC1, AC2 and EX stages. Note also that each clock cycle includes two phases, denoted $\phi 1$ and $\phi 2$.

The general operation of the blocks of FIG. 1a and the timing of FIG. 1b, both in connection with a single clock instruction, are as follows. As previously mentioned, during stage ID1, instruction decoder 21 determines the number of bytes in the single clock instruction and the types of fields included in the instruction. Decoder 21 also provides entry point microaddresses derived from the instructions for addressing microROM circuit 148. During stage ID2, microsequencer circuit 146 outputs the next microaddress for microROM circuit 148 for both the x- and y-instruction.

For purposes of explanation, the next microaddresses are labeled as $\mu sx_1$ and $\mu sy_1$, respectively, with $\mu s$ indicating output from the microsequencer. Note that $\mu sx_1$ is output by microsequencer circuit 146 during the first phase, $\phi 1$, of stage ID2. Similarly, $\mu sy_1$ is output by microsequencer circuit 146 during the second phase, $\phi 2$, of stage ID2.

Microsequencer circuit 146 operates as a sophisticated multiplexer; thus, in response to its control signals, microsequencer circuit 146 chooses from its microaddress inputs to output the next microaddress. In the preferred embodiment, the next microaddress selected and output by microsequencer circuit 146 may be one of eight different microaddresses. The provision of some of the microaddresses is specifically described throughout this document, with it understood that the remainder fall within the general indication in FIG. 1a of an input providing microaddresses to multiplexer circuit 146. Briefly, the seven different microaddresses are:

(1) instruction entry point—this microaddress is provided by decoder 21 and is selected when a new instruction is to enter the EX stage;

(2) exception PLA—this microaddress is selected to service an interrupt or an exception;

(3) NOP—this microaddress is selected when there are no instructions in the corresponding pipeline to be executed;

(4) micro return—this microaddress is selected from the top of the return stack;

(5) microROM next microaddress—this microaddress is selected from the current output by microROM circuit 148 and may be used to select the next sequential pair of microinstructions, or the target microaddress of certain calls or conditional microbranches;

(6) ntaken:—this address is selected when certain conditional microbranches are not taken; and (7) change of flow microaddress—this microaddress is a concatenated address formed in part from the microROM next microaddress and in part from an instruction decode circuit. The preferred method of generating this microaddress is discussed in detail in section 5, below.

The microaddresses are applied by microsequencer circuit 146 to microROM circuit 148, which outputs a microinstruction to carry out whatever functionality is called for by the corresponding microaddress. Thus, returning to FIG. 1b, immediately following the output of microaddress $\mu sx_1$, that is, following $\phi 1$ of stage ID2, $\mu sx_1$ is applied to microROM circuit 148. As described in greater detail in section 4, below, between $\phi 2$ of stage ID2 and by the end of $\phi 1$ of stage AC1, an array within microROM circuit 148 generates and outputs the corresponding microinstruction, labeled $\mu rx_1$. Note, for clarity, $\mu r$ suggests output from microROM circuit 148. Moreover, immediately following the output of microaddress $\mu sy_1$ (following $\phi 2$ of stage ID2), $\mu sy_1$ is applied to microROM circuit 148. Also as detailed in section 4, below, between $\phi 1$ and by the end of $\phi 2$ of stage AC1, the array of microROM circuit 148 generates and outputs the corresponding microinstruction, labeled $\mu ry_1$. Stage AC2 occurs in clock cycle 154 and the microinstructions corresponding to instructions X1 and Y1, $\mu rx_1$ and $\mu ry_1$, are presented to the applicable components of the microprocessor. Note in the preferred embodiment that each pipeline has its own respective address calculation stage and, thus, the x- and y-microinstructions are presented accordingly. Thus, clock cycle 154 is illustrated as applying to both "$x_1$ & $y_1$" during the entire duration of the AC2 stage. Moreover, in the AC2 stage, each respective microinstruction is decoded in preparation for execution. Finally, stage EX occurs in clock cycle 156, where the decoded instructions are applied to respective x- and y-pipeline ALUs, thereby executing the functions specified by the presented microinstructions. Like the AC2 stage, the x- and y-operations occur independently of one another and, hence, are illustrated as applying to both "$x_1$ & $y_1$" during the entire duration of the EX stage. Note that because FIG. 1b corresponds to the flow of a single clock instruction, only a single clock cycle 156 is necessary for the execution stage of the instruction. Multiple clock instructions require additional execution stages.

Having explained the general flow of FIG. 1b, note that one aspect of the present invention pertains to enhancing the timing of output by microROM circuit 148 immediately following a single clock instruction. Particularly, the present invention recognizes that once a given instruction is determined to be a single clock instruction, it is desirable to advance the next successive instruction through the pipeline as soon as possible. More specifically, when the instruction presently passing through a pipeline is a single clock instruction and, thus, requires only a single clock cycle for its EX stage, it is preferable to immediately advance the next successive instruction so that it follows only one stage behind the present single clock instruction. FIG. 1c illustrates this preferred scenario.

Particularly, FIG. 1c illustrates a timing diagram including the instruction flow for two successive instructions through the x- and y-pipelines over the same clock cycles 150 through 156 shown in FIG. 1b. Subscripts in FIG. 1c illustrate the succession of the two instructions. The first x- and y-instructions, denoted with a subscript one, are single clock instructions and flow in the same manner as the instruction shown in FIG. 1b. The second x- and y-instructions, denoted with a subscript two, are additional instructions which follow one stage immediately behind the first x- and y-instructions. Given the immediate succession of instruction flow, no stage is wasted, that is, no clock cycle occurs during the illustrated instruction flow where the instruction is not processed by either the ID1, ID2, AC1, AC2, or EX stage.

The prior art is unable to achieve the preferred flow of FIG. 1c for a single clock instruction. FIG. 1d illustrates a timing diagram of the flow In the prior art for the two paired instructions of FIG. 1c. Note that the microsequencer outputs for the second instruction, $\mu sx_2$ and $\mu sy_2$, are output during clock cycle 154, rather than clock cycle 152 as shown in the inventive preferred flow of FIG. 1c. Thus, clock cycle 152 is wasted in the prior art. Such a result occurs because of the prior art methodology in controlling the microsequencer circuit's output. Specifically, in the prior art, the microinstruction output by the microROM for a single clock instruction, $\mu r$, includes a control signal which subsequently (after a wasted clock cycle) causes the microsequencer circuit to output the next microROM microaddress, $\mu s$. More particularly, for each different microinstruction, a given bit or bits in $\mu r$ indicate that an instruction is a single clock instruction. Only after this indication is the microsequencer caused to output the next microaddress, $\mu s$. This indication and delay is shown by an arrow in FIG. 1d. As shown, at the end of $\phi 1$ of clock cycle 152, the microinstruction, $\mu rx1$, indicates that its corresponding instruction is a single clock instruction. As described above, the next microaddress, $\mu sx2$, is output only after this indication and, thus, cannot occur until the beginning of clock cycle 154. Thus, in effect, the microsequencer must "wait on" the microROM output and, hence, at least one clock cycle is wasted during this waiting period. Note that the same delay occurs for the y-pipeline as shown by the delay arrow in FIG. 1d between the microROM output $\mu ry1$, and the responsive next output by the microsequencer, $\mu sy2$. In contrast to FIG. 1d, however, the present invention includes a novel apparatus and methodology for achieving the preferred and improved flow of FIG. 1c, and is described below.

FIG. 2 illustrates the block diagram of FIG. 1a, but with additional details used to achieve the preferred timing of FIG. 1c. Specifically, instruction decoder 21 includes separate registers 21x and 21y for the x- and y-instructions, respectively. Moreover, each separate register 21x and 21y is coupled to a respective programmable logic array ("PLA"). More particularly, PLAs 158x and 158y are coupled to the portions of registers 21x and 21y storing the opcode of each instruction. Note that while the opcode is illustrated as left-justified within each respective register 143x and 143y, such an illustration is arbitrary in that the opcode may be stored anywhere within the buffer and is not necessarily represented by contiguous bits therein. Each PLA 158x and 158y is further coupled to the control input of a respective microsequencer 146x and 146y. Lastly, while not illustrated, note that each PLA 158x and 158y may be further coupled to additional inputs to perform the functionality described below.

The operation of the components of FIG. 2 are best explained in the context of the timing diagram of FIG. 1c. Assume first that each instruction register 21x and 21y stores two sequentially pipelined instructions, $x_1$ and $x_2$, and $y_1$ and $y_2$, respectively. Thus, as shown in FIG. 1c, during $\phi 1$ of the ID2 stage of clock cycle 150, microsequencer 146x receives control signals and outputs the next microaddress, $\mu sx_1$. Moreover, during $\phi 2$ of the ID2 stage of clock cycle 150, microsequencer 146y receives control signals and outputs the next microaddress, $\mu sy_1$. Once $\mu sx_1$ and $\mu sy_1$ are output, they are applied to microROM circuit 148 to generate $\mu rx_1$ and $\mu ry_1$ as described above.

Returning to the ID2 stage occurring in clock cycle 150, however, note that each PLA 158x and 158y decodes the opcode of the respective instruction to determine whether the current instruction is a single clock instruction. In the preferred embodiment, the PLA is programmed to detect any possible pattern of opcode bits which comprise a single clock instruction. This detection may be based on a portion or all of the opcode bits. If the PLA detects a single clock instruction, the PLA controls its respective microsequencer to output the next microaddress, $\mu s$, during the immediately following clock cycle. For example, if PLA 158x determines that instruction $x_1$ is a single clock instruction, PLA 158x controls microsequencer 146x to output the next microaddress, $\mu sx_2$, during the next clock cycle 152 as shown in FIG. 1c. As another example, if PLA 158y determines that instruction $y_1$ is a single clock instruction, PLA 158y controls microsequencer 146y to output the next microaddress, $\mu sy_2$, during the next clock cycle 152 as shown in FIG. 1c.

Note that each PLA 158x and 158y may analyze information in addition to selected opcode bits determine whether an instruction is a single clock instruction. For example, in an X86 architecture, other bits within the instruction may be analyzed, such as selected bits of the mod r/m byte. Moreover, in addition to opcode bits, bits outside the instruction may also be analyzed. For example, a bit indicating whether or not the protected mode is set also may be analyzed in determining whether an instruction is a single clock instructions. Other examples may become known to a person skilled in the art, and are intended as within the scope of the present invention.

From the above, it should be appreciated that the configuration of FIG. 2 eliminates the wasted clock cycle between successive microinstructions as possible in the prior art. Such an advance is extremely beneficial for a microprocessor using numerous single clock instructions because delay is reduced with respect to each of those instructions. As stated at the outset, instruction throughput is of primary importance and, as now shown, the present invention enhances such throughput. Note that it should be understood that a person skilled in the art may choose alternatives without necessarily departing from the inventive scope. For example, while the example discussed in connection with FIG. 1c illustrates single clock instructions in both the x- and y-pipelines, the present invention also applies to a dual pipeline architecture when only one of the two pipelines is executing a single clock instruction (i.e., irrespective of the number of execution stages required by the instruction in the other pipeline). Thus, the invention also applies to other single or multiple pipeline architectures. As yet another example, while a PLA is shown monitoring opcode bits, structure other than a PLA may be used to detect the presence of a single clock instruction. As still another example, bits other than opcode bits may, given a particular architecture, be analyzed if representative of a single clock instruction.

4. Single MicroROM Operation for Supporting Dual Pipeline Architecture

As mentioned in connection with FIGS. 1a–d, the processor architecture of the present invention includes a microROM circuit 148 which receives microaddresses, and produces microinstructions, in accordance with the timing diagram of FIG. 1d. The present invention uses additional novel apparatus and methodology to achieve such timing while using a single microROM array. Particularly, FIG. 3 illustrates such apparatus, and FIG. 4 illustrates the detailed timing for the apparatus of FIG. 3.

Figure 3:
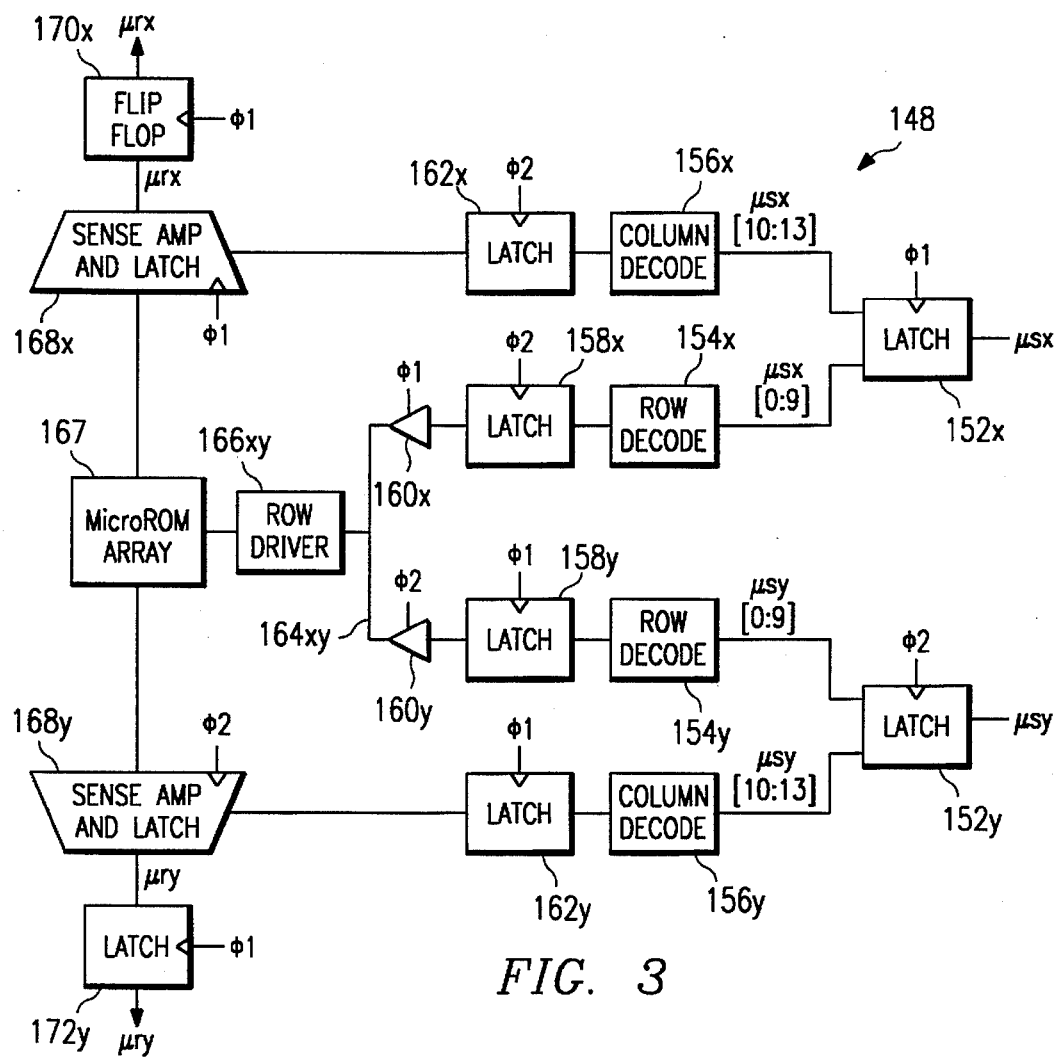
FIG. 3 illustrates the preferred apparatus for the microROM circuit.
Figure 4:
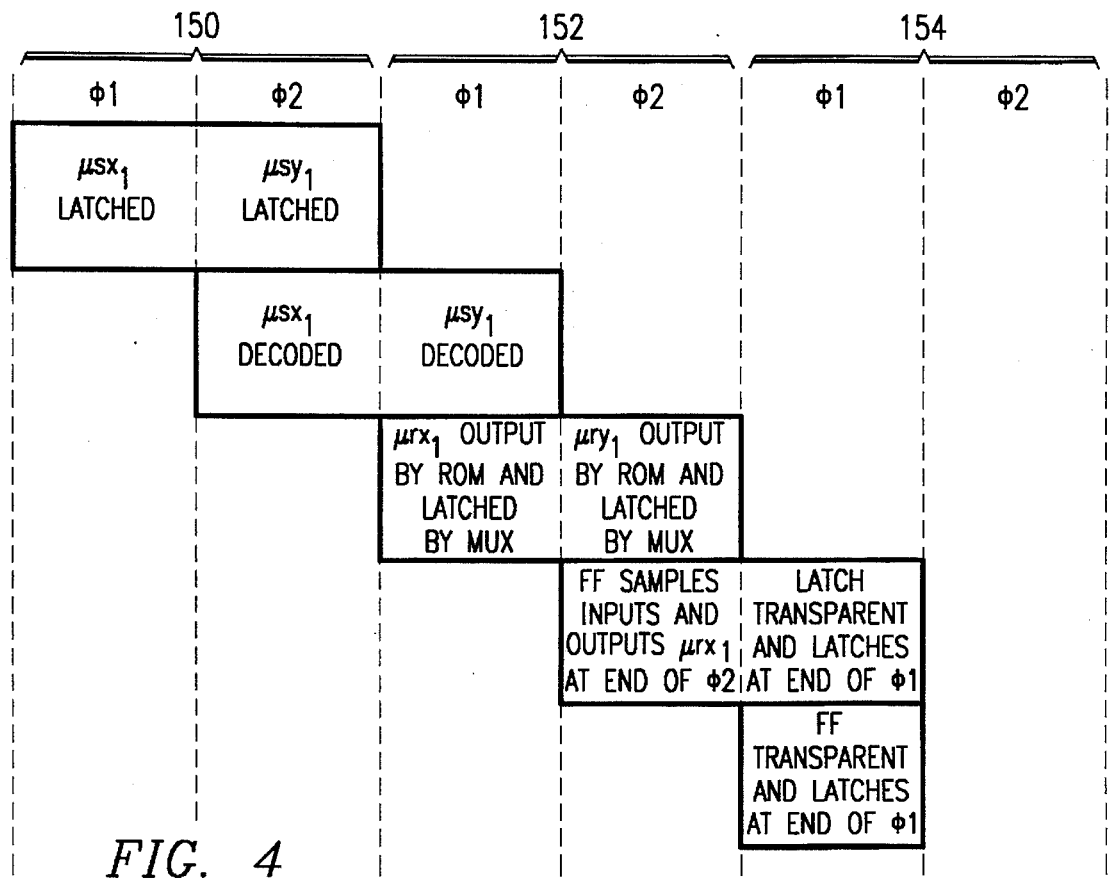
FIG. 4 illustrates a timing diagram for both the x- and y-accessing of the microROM array of the microROM circuit.

With reference to FIG. 3, microROM circuit 148 is shown in greater detail using blocks to represent various functionality. The blocks include a single microROM array 167 which services both the x- and y-pipelines. MicroROM array 167 includes a plurality of rows and columns for storing microinstructions which are addressed and output by the various blocks of FIG. 3. With the exception of two components described below, the remainder are generally symmetric about microROM array 167; accordingly, the following description focuses on the x-related blocks, with corresponding reference numerals using the "x" designation. Components pertaining to the y-related blocks are likewise labeled, but use the "y" designation.

The microaddress, μsx, is coupled to the input of a latch 152x which is clocked by φ1. In the preferred embodiment, μsx is a fourteen bit address which is broken into separate components for addressing a row and column of microROM array 167, respectively. Specifically, microinstructions are stored in array 167 such that sixteen instructions are stored along a row. Thus, once a row is selected, one of sixteen columns from that row is further selected to choose the particular microinstruction from the many stored along the row. In particular, ten bits of μsx are coupled from latch 152 to the input of a row decode block 154x. Similarly, four bits of μsx are coupled from latch 152 to the input of a column decode block 156x. While the groups of ten bits are shown as the first ten bits of μsx (i.e., [0:9]) and the last four bits of μsx (i.e., [10:13]), it should be understood that non-contiguous bits of μsx may be selected for either row or column decoding. It also should be understood that the microaddresses, μsx and μsy, may consist of more or less than fourteen bits.

The output of row decode block 154x is coupled to the input of a latch 158x clocked by φ2. Further, the output of latch 158x is coupled to the input of a tristate driver 160x clocked by φ1. Similarly, the output of column decode block 156x is coupled to the input of a latch 162x, which is clocked by φ2.

The output of tristate driver 160x is coupled to an address bus denoted 164xy suggesting, as discussed below, that either x- or y-addresses may be communicated on the bus. Indeed, note that the output of tristate driver 160y is also coupled to address bus 164xy. Address bus 164xy is coupled to the input of row driver 166xy, which is further coupled to microROM array 167. The circuitry symmetry in FIG. 3 creates componentry for the y-row related circuitry similar to that just described in connection with x-row related circuitry. Thus, bits [0:9] of μsy are coupled to a row decode block 154y which has an output coupled to the input of a latch 158y. The output of latch 158y is coupled to the input of a tristate driver 160y, which has an output coupled to address bus 164xy. Note, however, that although the data path for the y-row circuitry is similar to the x-row circuitry, the clock signals for latch 158y and driver 160y are switched to achieve the timing function described below.

Returning to the x-column related circuitry, the output of latch 162x is coupled to the control inputs of a sense amplifier, latch and multiplexer block 168x. Note that block 168x is capable of performing each of the functions of its name. Particularly, the data input of block 168x is coupled to an output of microROM array 167. Moreover, block 168x is clocked by φ1 to performing a latching function. Lastly, because the output of latch 162x is coupled to the control input of block 168x, block 168x latches only selective portions (i.e., a particular column) of a row of data output by microROM army 167 as discussed in greater detail below. The output of block 168x is coupled to the input of a flip flop 170x which is clocked by φ1. The output of flip flop 170x is coupled to any line, bus, or architecture which requires access to the x-microinstruction produced by microROM array 167.

The circuitry symmetry in FIG. 3 creates similar componentry for the y-column related circuitry. Thus, bits [10:13] of μsy are coupled to a column decode block 156y which is further coupled to the input of a latch 162y. The output of latch 162y is coupled to the control input of a sense amp, latch and multiplexer block 168y. Again, the y-column data path is therefore generally the same as they x-row data path, but the clocking signals are reversed to achieve the timing described below. Note also, however, that the y-row data path differs slightly in one regard, namely, the output of multiplexer block 168y is coupled to the input of a latch 172y. This is in contrast to the output of multiplexer block 168x which is coupled to a flip flop rather than a latch. This difference also accommodates the timing functionality described below. Moreover, the output of latch 172y is coupled to any line, bus, or architecture which requires access to the y-microinstruction produced by microROM array 167.

As shown in FIG. 1d, one invention of the preferred architecture involves two accesses of microROM circuit 148 in the same clock cycle 150, but in separate phases, φ1 and φ2. Further, by applying μrx and μry to microROM circuit 148 in a single clock cycle, μrx is fully available by the end of one clock cycle after μsx and, similarly, μry is fully available by the end of one clock cycle after μsy. The blocks of FIG. 3 permit such operation, and are best understood by the more detailed timing diagram of FIG. 4.

FIG. 4 illustrates a detailed timing diagram for both the x- and y-accessing of microROM array 167 during the clock cycles 150 through 154 shown in FIG. 1c. For purposes of clarity, the operation in connection with the x-pipeline (i.e., x-microaddress and x-microinstruction) is described first and illustrated along the leftmost portion of the diagonal flow of the figure. Similarly, the operation in connection with the y-pipeline (i.e., y-microaddress and y-microinstruction) is described second and illustrated along the rightmost portion of the figure.

With reference to the leftmost portion of FIG. 4, μsx$_1$ is latched by latch 152x by the close of φ1 of clock cycle 150. Accordingly, the appropriate bits of μsx$_1$ are provided to row and column decode blocks 154x and 156x, respectively.

Each of these decode blocks decodes the bits according to principles known in the art to identify the corresponding row and column within microROM array 167 which are addressed by μsx$_1$. Thus, the microaddress decode occurs during φ2 of clock cycle 150, and resulting row and column decoded signals are latched at the close of φ2 of clock cycle 150 by latches 158x and 162x, respectively. Note the decoded column signal output by latch 162x is immediately coupled to the control input of multiplexer block 168x.

Next, with the immediately following rising transition of φ1 during clock cycle 152, tristate driver 160x drives address bus 164xy with the decoded row value latched in latch 158x. This value is received by driver 166 which, in accordance with principles known in the art, provides a sufficient driving signal(s) to the selected row of microROM array 167. Thus, during φ1 of clock cycle 152, the driving operation and response by microROM array 167 operate to generate and output the appropriate signals of the addressed row. At the falling edge of φ1 of clock cycle 152, multiplexer 168x latches selected bits of the row of signals output by microROM array 167. Particularly, certain bits (i.e., a column which stores the desired microinstruction,) are selected in response to the decoded column address received from latch 162x and latched to the output of multiplexer 168x. Note that this event also corresponds to the end of φ1 during clock cycle 152 shown in FIG. 1b, above.

During φ2 of clock cycle 152, flip flop 170x samples its input and, upon the falling edge of φ2, flip flop 170x outputs the sampled input. Accordingly, at the end of φ2 of cycle 152, the x-pipeline microinstruction, μrx, is available to the remainder of the processor for operation of the AC2 stage described above. Note also that flip flop 170x is included to isolate the current microinstruction from any potential changes occurring in the output of microROM array 167 or multiplexer 168x. In other words, after the falling edge of φ2 of clock cycle 152, any change in the output of either microROM array 167 or multiplexer 168x does not affect the output of flip flop 170x during the next phase, φ1 of cycle 154. Thus, any such change will not affect the components of the processor examining the current μrx microinstruction.

Having described the operation of the x-microaddressing and x-microinstruction issuing methodologies, reference is now made to the rightmost portion of FIG. 4 to illustrate the contemporaneous operations with respect to the operations of issuing the y-microaddressing and y-microinstruction. First, μsy$_1$ is latched by latch 152y by the close of φ2 of clock cycle 150. Accordingly, the appropriate bits of μsy$_1$ are provided to row and column decode blocks 154y and 156y, respectively. Like the x-bits, but one phase later, the y-bits are decoded during φ2 of clock cycle 150 to identify the corresponding row and columns within microROM array 167 which are addressed by μsy$_1$. Moreover, the resulting row and column decoded signals are latched at the close of φ1 of clock cycle 152 by latches 158y and 162y, respectively.

Next, with the immediately following rising transition of φ2 during clock cycle 152, tristate driver 160y drives address bus 164xy with the decoded row value latched in latch 158y. Note that tristate driver 160x is in a high impedance mode during this time so that only the y-address is communicated to the address bus 164xy. Again, this value is received by driver 166 which drives the selected row of microROM array 167. Thus, during φ2 of clock cycle 152, the driving operation and response by microROM array 167 operate to generate and output the appropriate signals of the addressed row. At the falling edge of φ2 of clock cycle 152, multiplexer 168y latches selected bits (i.e., a column) of the row of signals output by microROM array 167. In this instance, these bits, which represent the desired microinstruction, are selected in response to the decoded column address received from latch 162y and latched to the output of multiplexer 168y. Note that this event also corresponds to the end of φ2 during clock cycle 152 shown in FIG. 1b, above.

During φ1 of clock cycle 154, latch 172y becomes transparent so that the signals at its inputs become available at its outputs. Thus, at the rising edge of φ1 of clock cycle 154, the remainder of the processor has access to the y-pipeline microinstruction, μry. Note that latch 172y, like that flip flop 170x, is included to isolate the current microinstruction from any potential changes occurring in the output of microROM array 167 or multiplexer 168y. Thus, at the end of φ1 of cycle 154, any change in the output of either microROM array 167 or multiplexer 168y does not affect the output of latch 172y during the next phase, φ2 of cycle 154. Thus, any such change will not affect the components of the processor examining the current μry microinstruction.

From the above, it should be appreciated that the functional blocks set forth in FIG. 3 permit the preferred timing shown in FIG. 4. Thus, using separate phases, a single microROM array 167 may be accessed twice in a single clock cycle, while still providing microinstructions corresponding to each access within one full clock cycle of the access. Thus, independent x- and y-pipelines may share the same single array without sacrificing throughput. Note that it should be understood that a person skilled in the art may choose alternatives without necessarily departing from the inventive functionality and structure described. For example, clock widths may be adjusted so that more than two phases occur in what is deemed a "clock cycle," while still maintaining the ability for multiple pipelines to share the same micoROM array. This example, as well as others apparent to one skilled in the art, should not depart from the invention as defined by its claims.

5. Expediting Execution of Condition Dependent Instructions

As discussed in connection with FIG. 1a, the preferred embodiment includes a microsequencer circuit 146 which operates as a sophisticated multiplexer to choose between various microaddresses at its inputs and output the selected microaddress for addressing microROM circuit 148. In connection with microsequencer circuit 146, the present invention further includes apparatus and methodology for expediting the execution of condition dependent instructions. In the preferred embodiment, one example of such a condition dependent instruction is a change of flow ("COF") instructions. Such COF instructions are known in the art and, include, by way of example in the X86 architecture, instructions such as FAR JUMP, FAR CALL, and IRET. The preferred apparatus and methodology for expediting such COF instructions, as well as other condition dependent instructions, are described in connection with FIG. 5, immediately below.

Figure 5:
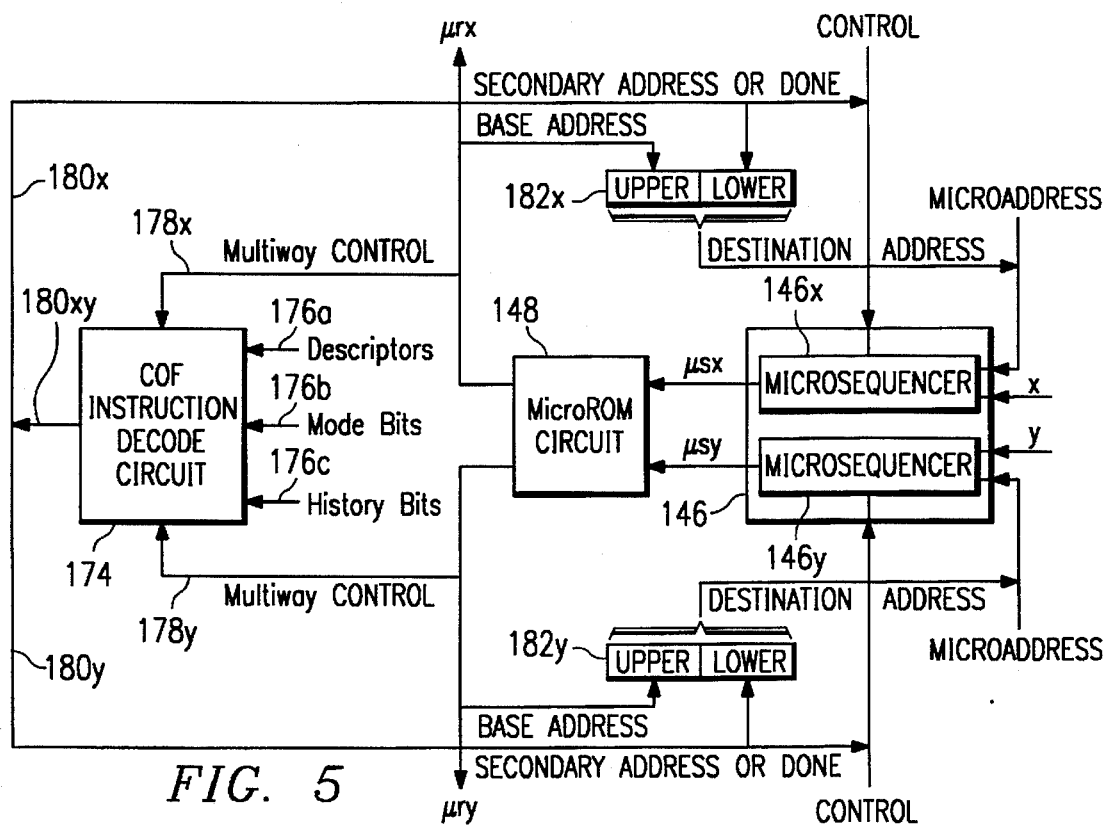
FIG. 5 illustrates a portion of the components of FIG. 1a, with additional apparatus for expediting change of flow ("COF"), or other condition dependent, instructions.

FIG. 5 illustrates a portion of the components of FIG. 1a, with additional apparatus for expediting condition dependent instructions. For the remainder of this discussion, the preferred embodiment is discussed, by way of example, as applying to COF instructions. It should be understood, however, that the COF instruction is by way of example, and is not intended to limit the scope of the invention as defined by its claims. Therefore, continuing with FIG. 5, it again illustrates microsequencer circuit 146 receiving microaddresses and, via various control signals, providing microaddresses μsx and μsy to microROM circuit 148. Particularly, however, apparatus in addition to FIG. 1a is shown for providing microaddresses and control in connection with COF instructions. Specifically, FIG. 5 further illustrates a COF instruction decode circuit 174. COF instruction decode circuit 174 includes various data inputs, preferably including an input 176a for receiving descriptors, an input 176b for receiving mode bits, and an input 176c for receiving "history bits." History bits include selected bits stored from previously issued instructions and/or bits from previously executed microinstructions corresponding to the present instruction being executed. COF instruction decode circuit further includes control inputs 178x and 178y for receiving control signals corresponding to the respective x- and y-instructions. For purposes more readily apparent below, these control signals are referred to herein as the x-Multiway and y-Multiway control signals, respectively.

COF instruction decode circuit further includes an output 180xy, which is illustrated as splitting into respective x- and y-outputs 180x and 180y. Output 180x is coupled to provide a SECONDARY ADDRESS to the lower portion of an address register 182x, or a DONE signal to control microsequencer 146x. Similarly, output 180y is coupled to provide the SECONDARY ADDRESS to the lower portion of an address register 182y, or the DONE signal to control microsequencer 146y. The upper portion of address register 182x is coupled to the x-output of microROM circuit 148 and, thus, is capable of receiving a portion of the x-microinstruction, μrx. As described in greater detail below, this connection permits μrx to provide a BASE ADDRESS to the upper portion of address register 182x. Similarly, the upper portion of address register 182y is coupled to the y-output of microROM circuit 148 and, thus, is capable of receiving a portion of the y-microinstruction, μry. Thus, also as described in greater detail below, this connection permits μry to provide a BASE ADDRESS to the upper portion of address register 182y.

Before proceeding with the operation of the apparatus of FIG. 5, a discussion of at least one known prior art technique for handling COF instructions, or other types of conditional dependent instructions, is instructive. This discussion is further described using the microinstructions of Table 1, with it understood that such microinstructions are provided solely by way of example to facilitate an understanding of the known prior art. In the known prior art, a COF instruction would commence its execution stage by addressing a first microinstruction within the microROM. For the COF instruction, after its first, or subsequent microinstructions, a series of sequential conditional microinstruction JUMPs ("CJUMP") are typically encountered, wherein each of those CJUMPs tested various conditions. Thus, referring to Table 1, consider the instance where a COF instruction commenced by addressing the first of the four successive microinstructions located at address 1 of the microROM:

TABLE 1

| 1 | CJUMP condition #1 | 10 |
|---|---|---|
| 2 | CJUMP condition #2 | 11 |
| 3 | CJUMP condition #3 | 12 |
| 4 | CJUMP condition #4 | 13 |
| 5 | DONE | |
| microinstruction address | microinstruction | destination if condition met |

In the prior art, if condition #1 were met, the microROM would output address 10, which is the next (or "destination") microinstruction address within itself for continuing the execution of the COF instruction. The process flow would then sequence by jumping to the microinstruction at location 10, and continue until the functionality for the COF instruction was completed. If condition #1 were not met, however, then a counter was used to increment a portion of the microaddress which identified the then-executing microinstruction. Thus, the incremented value would identify address 2 and so the sequence would address the microinstruction at that address. Again, the successive microinstruction would test another condition, namely, condition #2. The process would repeat until a condition was met, or all conditions in the succession were tested with no satisfaction. If no conditions were met, the microROM would issue a DONE signal, thereby indicating that the COF instruction had completed its execution cycle, and the instruction entry point into the microROM for the next instruction could be accessed. Note that the above example uses sequential numbers only to facilitate an understanding of the concept, but is not intended to indicate that the conditional microinstructions are necessarily addressed in an integer incremental fashion.

From Table 1 and its corresponding description, one skilled in the art may readily appreciate that numerous CJUMPs may be necessary before a condition corresponding to the COF instruction (or other conditional dependent instruction) being executed is satisfied. Typically, each testing of a condition and issuance of the next condition to be tested expends at least one clock cycle. Thus, if numerous conditions were unsatisfied for a given COF instruction, numerous clock cycles were expended in executing that COF instruction. In the preferred embodiment of the present invention, however, and as described immediately below, such conditional testing is reduced to a single clock cycle, with the clear benefit of reducing the number of potential clock cycles and, thus, enhancing overall processing speed.

Having described the prior art example above, reference is made to the operation of the apparatus of FIG. 5. When the COF (or other condition dependent) instruction is received by the instruction decoder (see, e.g., FIG. 1a), its execution stage commences by issuing a control signal from microROM circuit 148. For purposes of explanation, this signal is identified herein as "Multiway," indicating that flow can change to multiple different destinations (i.e., ways) in the next successive clock cycle. Thus, if the COF instruction is executing in the x-pipeline, an x-Multiway control signal is output by microROM circuit 148 as part of the x-microinstruction. The x-Multiway control signal controls COF instruction decode circuit 174 as described below. The x-microinstruction also simultaneously includes a BASE ADDRESS which loads into the upper portion of address register 182x.

COF instruction decode circuit 174 preferably includes combinatorial logic which analyzes the various preferred information at its inputs 176a, 176b, and 176c, and determines a SECONDARY ADDRESS in response to those inputs. In the preferred embodiment, the SECONDARY ADDRESS is a four bit signal and, thus, is able of identifying up to sixteen (i.e., $2^4=16$) specific addresses. Moreover, the SECONDARY ADDRESS is preferably calculated based on the input information before the issuance of the Multiway control signal. Thereafter, as in the example of the x-Multiway control signal above, issuance of the Multiway control signal causes the already-determined SECONDARY ADDRESS to load from COF instruction decode circuit 174 into the lower portion of address register 182x.

At this point, both the lower and upper portions of address register 182x are loaded with address portions. Those portions are then combined, preferably by concatenation, to form a single DESTINATION ADDRESS. This DESTINATION ADDRESS is the location within microROM circuit 148 for proceeding with the execution of the COF instruction. Accordingly, the DESTINATION ADDRESS is coupled to microsequencer 146x which selects it and couples it to microROM circuit 148, thereby addressing and executing the next microinstruction of the execution stage for the COF instruction.

Note that the operation described in connection with the x-pipeline applies equally to the y-pipeline. Thus, at the same time that decode circuit 174 outputs it SECONDARY ADDRESS to the lower portion of address register 182x, the same ADDRESS is outputted to the lower portion of address register 182y. For the y-pipeline, a different BASE ADDRESS is provided from microROM circuit 148, and this different BASE ADDRESS combines with the SECONDARY ADDRESS in the same manner, and for the same purpose, as described in connection with the x-pipeline. Similarly, the DONE signal, described in further detail below, is also coupled simultaneously from decode circuit 174 to both microsequencer 146x and 146y.

From the above, it therefore should be appreciated that the embodiment of FIG. 5 removes the necessity to exhaust numerous conditional jumps, and resulting clock cycles, in advancing the execution of a COF, or other condition dependent, instruction. Particularly, the preferred embodiment requires only a single clock cycle, whereas the prior art required multiple clock cycles, to determine the destination address for executing the COF instruction. Naturally, therefore, throughput is enhanced, particularly with applications involving numerous COF instructions.

As described briefly above, COF instruction decode circuit 174 may provide a DONE signal to cause control of microsequencer 146x in lieu of providing the SECONDARY ADDRESS to address register 182x as detailed above. This same functionality applies to the y-components and, hence, COF instruction decode circuit 174 may provide a DONE signal to cause control of microsequencer 146y in lieu of providing the SECONDARY ADDRESS to address register 182y. This feature also provides advantages over the prior art.

Again, before detailing the DONE signal aspect of the present invention, a reminder of the known prior art technique for indicating the completion of execution of the COF, or other condition dependent, instruction is instructive. Recall from the description above that the known prior art methodology issued a DONE signal from the microROM. Typically, this occurred only after all other conditions in a sequence were tested, or after an alternative routine performed its steps and addressed the microROM so that it would issue a DONE signal. Moreover, the known prior art further required a one-clock advanced notice that the COF instruction was complete and, hence, two clock cycles were expended in providing an indication that execution of the COF instruction was DONE. In contrast, the present invention reduces the number of clock cycles in indicating a completion of the COF instruction. Accordingly, successive instructions may be advanced through the pipeline and, thus, throughput is enhanced.

The specific implementation of the DONE signal generation in accordance with the present invention is as follows. Again, COF instruction decode circuit 174 operates independently of accesses to microROM circuit 148. Moreover, in the present embodiment, because of the various input data available to COF instruction decode circuit 174, it may determine when a COF instruction has completed its execution stages. Thus, when the Multiway control signal is received by COF instruction decode circuit 174, in lieu of a SECONDARY ADDRESS, it outputs a DONE signal if the combination of its inputs indicates completion of the execution of the COF instruction. In the preferred embodiment, the DONE signal is encoded in the same four bit output from decode circuit 174 discussed above in connection with the SECONDARY ADDRESS. Such a configuration permits dual use of the same conductors without an independent output. One skilled in the art, however, may readily appreciate that a separate output could be provided, with more or less bits, for communicating the DONE signal.

The DONE signal from COF instruction decode circuit 174 is coupled to microsequencer circuit 146, and controls circuit 146 such that the next microaddress it selects is the entry point microaddress to the instruction following the COF instruction. Accordingly, one skilled in the art may appreciate that the present invention immediately indicates the completion of the COF instruction without requiring the microROM to indicate such status. Thus, one or more clock cycles are saved over the known prior art embodiment described above.

Note that while the present invention has been described in detail, numerous alterations, modifications, or substitutions could be made hereto. For example, various techniques and/or architectures for calculating the SECONDARY ADDRESS and DONE signals are readily appreciated by a person skilled in the art, given an understanding of the specific microprocessor architecture, instruction set, and the need to jump to various different locations within microROM circuit 148 based on the satisfaction of various conditions. Indeed, the various input data to decode circuit 174 may be altered to accommodate a change in the COF instruction set and/or the desired resultant address(es) based on those instructions and the conditions tested by such instructions. The same applies to the formation of the DONE signal. Moreover, as stated in numerous instances above, the present invention may also extend to conditional dependent instructions other than COF instruction. Any derivations of these inputs or instructions, as well as other modifications or substitutions to the invention, should not affect the scope of the intended invention.

6. Conclusion

Note that although the preferred embodiment has been disclosed, various alternatives may be made by a person skilled in the art without departing from the invention as claimed. Numerous examples of such alternatives have been set forth throughout. As another example, while block diagrams have been shown herein, it should be understood that such blocks represent the methodology of the invention and, thus, do not necessarily limit its scope; hence, various functions may be moved to other defined areas of the microprocessor without necessarily departing from the scope of the invention. As yet a final example, while the architecture and timing diagrams involve a dual-pipeline scenario, various aspects of the present invention may be applied to a single pipeline, or other multiple-pipeline, processor architecture. The invention encompasses any modifications or alternative embodiments that fall within the scope of the Claims.

What is claimed is:

1. A processor, comprising:
   storage circuitry for storing an instruction;
   a single microROM addressable by a microaddress for outputting a microinstruction in response to said microaddress;
   sequencing circuitry coupled to provide said microaddress to said single microROM; and
   decode circuitry coupled to said storage circuitry for detecting whether said instruction stored in said storage circuitry comprises a single clock instruction before said single microROM outputs said microinstruction, and for indicating to said sequencing circuitry in response to detecting whether said instruction stored in said storage circuitry comprises a single clock instruction.

2. The processor of claim 1 wherein said decode circuitry comprises a programmable logic array.

3. The processor of claim 1 wherein said instruction comprises opcode bits, and wherein said decode circuitry is responsive to said opcode bits to detect whether said instruction stored in said storage circuitry comprises a single clock instruction.

4. The processor of claim 1 wherein said storage circuitry comprises a register.

5. The processor of claim 1 wherein said storage, sequencing, and decode circuitry comprise first storage, first sequencing, and first decode circuitry, respectively, and wherein said instruction and said microaddress comprises a first instruction and a first microaddress, respectively, and further comprising:

second storage circuitry for storing a second instruction;

second sequencing circuitry coupled to provide a second microaddress to said single microROM; and second decode circuitry coupled to said second storage circuitry for detecting whether said second instruction stored in said storage circuitry comprises a single clock instruction before said single microROM outputs said second microinstruction, and for controlling said second sequencing circuitry in response to detecting whether said second instruction stored in said second storage circuitry comprises a single clock instruction.

6. The processor of claim 1 wherein said instruction comprises opcode bits, and wherein said decode circuitry detects whether said instruction stored in said storage circuitry comprises a single clock instruction by detecting a plurality of said opcode bits.

7. The processor of claim 1 wherein said instruction comprises opcode bits, and wherein said decode circuitry detects whether said instruction stored in said storage circuitry comprises a single clock instruction by detecting a plurality of said opcode bits and by detecting a protected mode bit external from said instruction.

8. A method of addressing a single microROM storing microinstructions and addressable by a microaddress for outputting a microinstruction, comprising the steps of:

storing an instruction;

issuing a microaddress corresponding to the instruction;

outputting a microinstruction in response to the microaddress from said issuing step; and detecting whether the instruction stored in said storage step comprises a single clock instruction before said step of outputting the microinstruction.

9. The method of claim 8 wherein the instruction comprises a first instruction and the microaddress comprises a first microaddress, and further comprising the step of issuing a second microaddress corresponding to a second instruction in response to detecting the first instruction comprises a single clock instruction.

10. The method of claim 8 wherein said detecting step comprises:

inputting at least a portion of the instruction to a logic circuit; and outputting a control code representing a single clock instruction from said logic circuit in response to the portion.

11. The method of claim 10 wherein said step of inputting comprises inputting opcode bits of the instruction.

12. The method of claim 8 wherein said steps of storing, issuing, outputting, and detecting comprise first steps of storing, issuing, outputting, and detecting relative to a first instruction, a first microaddress, and a first microinstruction corresponding to a first processor pipeline, and further comprising the steps of:

storing a second instruction;

issuing a second microaddress corresponding to the second instruction;

outputting a second microinstruction in response to the microaddress from said issuing step; and detecting whether the second instruction stored in said second-stated storage step comprises a single clock instruction before said second step of outputting the microinstruction;

wherein said second-stated steps of storing, issuing, outputting, and detecting comprise second steps of storing, issuing, outputting, and detecting relative to a second instruction, a second microaddress, and a second microinstruction corresponding to a second processor pipeline.

13. A processor, comprising:

storage circuitry for storing an instruction having opcode bits;

a single microROM addressable by a microaddress for outputting a microinstruction in response to said microaddress;

sequencing circuitry coupled to provide said microaddress to said single microROM; and logic circuitry coupled to said storage circuitry and responsive to said opcode bits for detecting whether said instruction stored in said storage circuitry comprises a single clock instruction before said single microROM outputs said microinstruction, and for indicating to said sequencing circuitry in response to detecting whether said instruction stored in said storage circuitry comprises a single clock instruction.

* * * * *

UNITED STATES PATENT AND TRADEMARK OFFICE
CERTIFICATE OF CORRECTION

PATENT NO. : 5,644,741
DATED : July 1, 1997
INVENTOR(S) : Bluhm, et. al.

It is certified that error appears in the above-identified patent and that said Letters Patent is hereby corrected as shown below:

Column 2, lines 50-52, the description of FIG. 1c should read
-- illustrates a timing diagram showing the preferred timing of one aspect of the present invention in generating a microinstruction and obtaining the next successive microaddress; --

Column 2, lines 53-56, the description of FIG. 1d should read
-- illustrates a timing diagram showing the wasted clock cycle in the prior art between generation of a microinstruction and obtaining the next successive microaddress; --

Signed and Sealed this

Thirtieth Day of June, 1998

Attest:

BRUCE LEHMAN

Attesting Officer

Commissioner of Patents and Trademarks